(12) United States Patent
Horito et al.

(10) Patent No.: US 10,349,782 B2
(45) Date of Patent: Jul. 16, 2019

(54) HELICOID WHISK FOR USE IN A BOTTLE

(71) Applicant: Rocketship, Inc., Provo, UT (US)

(72) Inventors: Christian Horito, Provo, UT (US); Michael Horito, Provo, UT (US); Michael Anderson, Springville, UT (US); John Omdahl, Lindon, UT (US); Tyler Allan, Highland, UT (US); Jason Brinkerhoff, Lindon, UT (US)

(73) Assignee: Rocketship, Inc., Provo, UT (US)

( * ) Notice: Subject to any disclaimer, the term of this patent is extended or adjusted under 35 U.S.C. 154(b) by 0 days.

(21) Appl. No.: 15/089,369

(22) Filed: Apr. 1, 2016

(65) Prior Publication Data
US 2016/0287020 A1    Oct. 6, 2016

Related U.S. Application Data

(60) Provisional application No. 62/143,027, filed on Apr. 3, 2015.

(51) Int. Cl.
*A47J 43/27* (2006.01)
*B01F 7/00* (2006.01)
*B01F 13/00* (2006.01)
*B01F 15/00* (2006.01)
*B01F 3/12* (2006.01)

(52) U.S. Cl.
CPC ............... *A47J 43/27* (2013.01); *B01F 3/12* (2013.01); *B01F 7/00916* (2013.01); *B01F 13/005* (2013.01); *B01F 15/00512* (2013.01); *B01F 2215/0022* (2013.01)

(58) Field of Classification Search
CPC .... A47J 43/27; A47J 43/1087; A47J 43/1093; A47J 45/06
USPC ................. 366/129, 308, 343; 416/70 R, 72
See application file for complete search history.

(56) References Cited

U.S. PATENT DOCUMENTS

| | | | | | |
|---|---|---|---|---|---|
| 130,297 | A | * | 8/1872 | Hood | A47J 43/1093 416/235 |
| 259,056 | A | * | 6/1882 | Sherwood | A47J 43/1093 366/343 |
| 359,976 | A | * | 3/1887 | Johnson | A47J 43/1093 416/70 R |
| 365,624 | A | * | 6/1887 | Paine | B63H 1/30 366/129 |
| 504,112 | A | * | 8/1893 | Paine | A47J 43/1093 15/143.1 |
| 671,516 | A | * | 4/1901 | Hegner | B63H 16/04 366/129 |

(Continued)

OTHER PUBLICATIONS

Trimr Duo Classic Water & Shaker Bottle, offered for sale at least as early as May 4, 2018, available at <https://www.amazon.com/Trimr-Classic-Water-Shaker-Bottle/dp/B01L8KOHYA>.

*Primary Examiner* — Abbas Rashid
(74) *Attorney, Agent, or Firm* — Durham Jones & Pinegar; Sarah W. Matthews; Randall B. Bateman

(57) ABSTRACT

An agitator for mixing solutions in a bottle is described. The agitator is comprised of a handle portion and a whisk portion. The agitator may have a helical-shape to encourage spinning of the agitator as liquid flows past the agitator. The whisk may be flat-bottomed and formed of a flexible material, such that when the whisk portion comes into contact with the bottom of the bottle, the whisking members splay outwardly.

20 Claims, 11 Drawing Sheets

(56) References Cited

U.S. PATENT DOCUMENTS

| | | | | |
|---|---|---|---|---|
| 781,917 | A | * | 2/1905 | Smith ................ A47J 43/1093 366/129 |
| 1,025,798 | A | * | 5/1912 | Fitch .................... B01F 13/002 366/343 |
| 1,064,729 | A | * | 6/1913 | Hickey .................... B65G 7/12 294/15 |
| 1,134,170 | A | * | 4/1915 | Washburn ........... A47J 43/1093 366/129 |
| 1,155,215 | A | * | 9/1915 | Cooley ............... A47J 43/1093 366/129 |
| 1,208,862 | A | * | 12/1916 | Velissarides ............. B63H 1/30 366/129 |
| 1,290,231 | A | * | 1/1919 | Kenley ............... A47J 43/1018 366/332 |
| 1,530,716 | A | * | 3/1925 | Doerr .................... B01F 13/002 30/307 |
| 1,713,876 | A | * | 5/1929 | Knuppe ............... A47J 43/1093 241/301 |
| 2,126,890 | A | * | 8/1938 | Jensen ................ A47J 43/1087 366/129 |
| 2,670,938 | A | * | 3/1954 | Wittmann ........... A47J 43/1068 366/325.6 |
| 2,906,510 | A | * | 9/1959 | Harris ................ A47J 43/1087 15/141.1 |
| 2,922,628 | A | * | 1/1960 | Koe ...................... A47J 43/105 366/129 |
| 3,991,983 | A | * | 11/1976 | Drynan ............... A47J 43/1087 366/129 |
| 6,247,837 | B1 | * | 6/2001 | Wardberg ........... B01F 7/00066 366/129 |
| 9,642,495 | B2 | * | 5/2017 | Venot ................. A47J 43/1093 |
| 2008/0068921 | A1 | * | 3/2008 | Schanche .............. A47J 19/005 366/129 |
| 2017/0065943 | A1 | | 3/2017 | Dayton |

\* cited by examiner

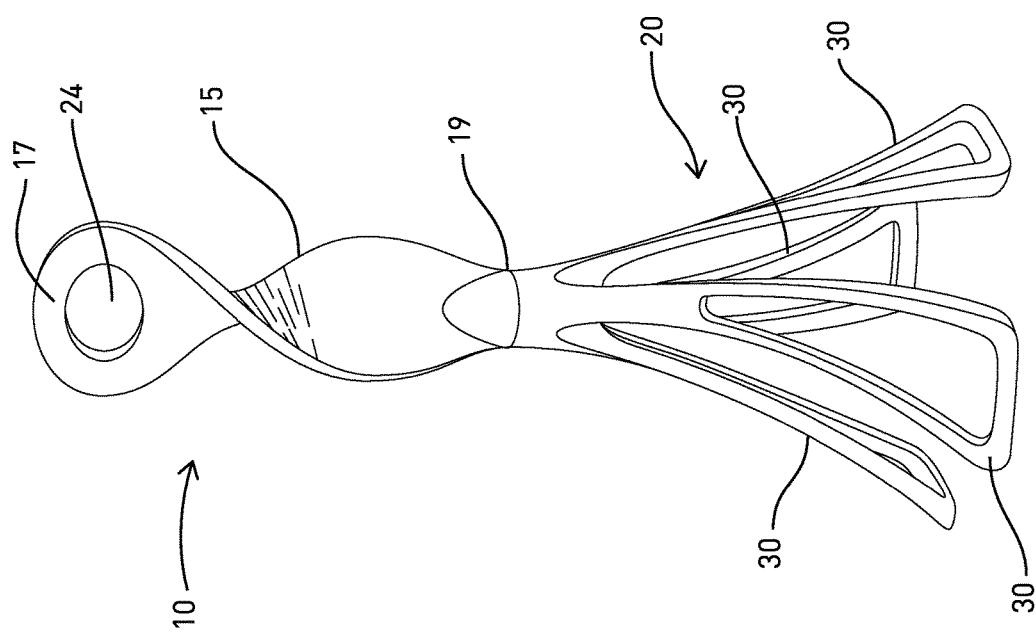

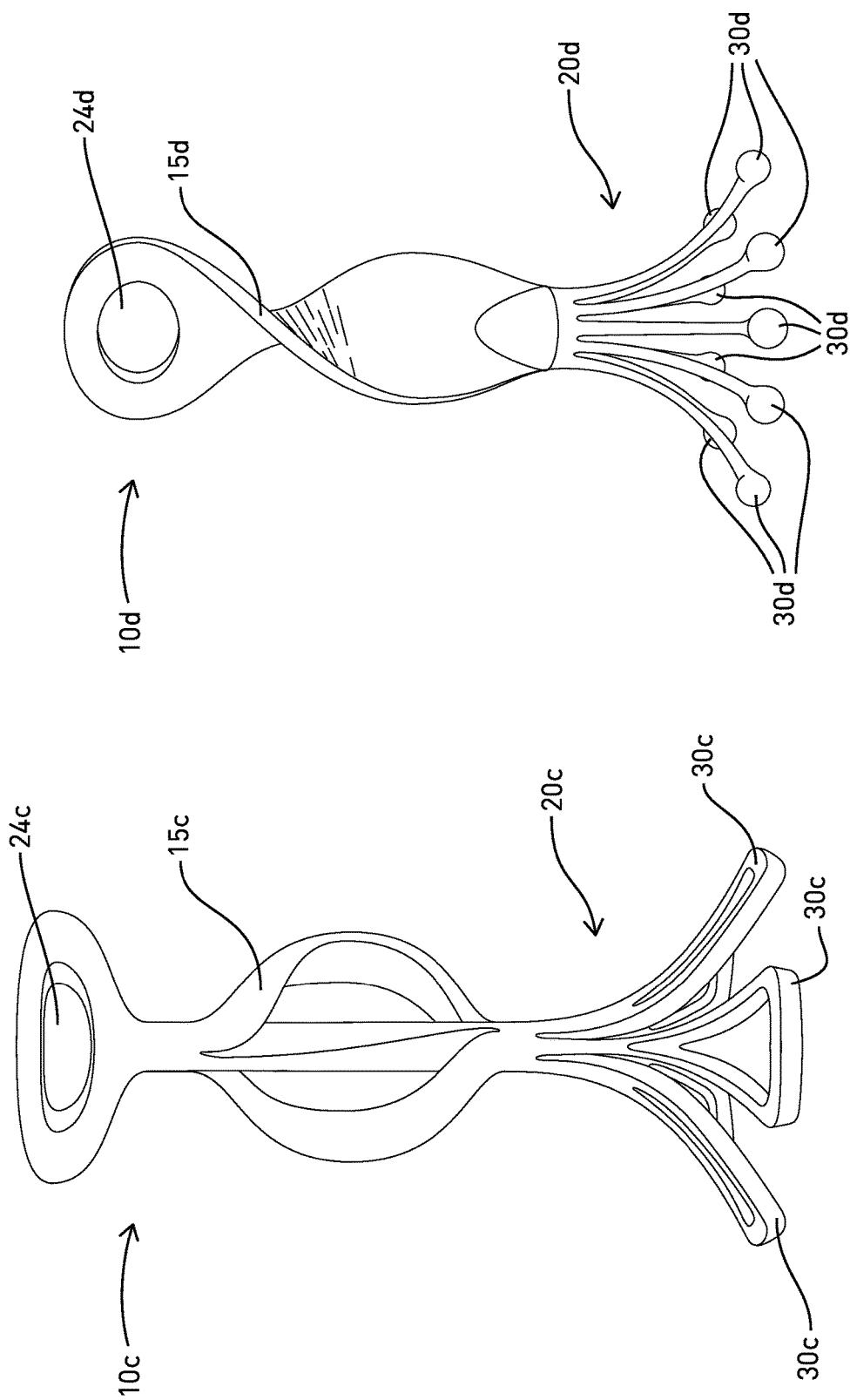

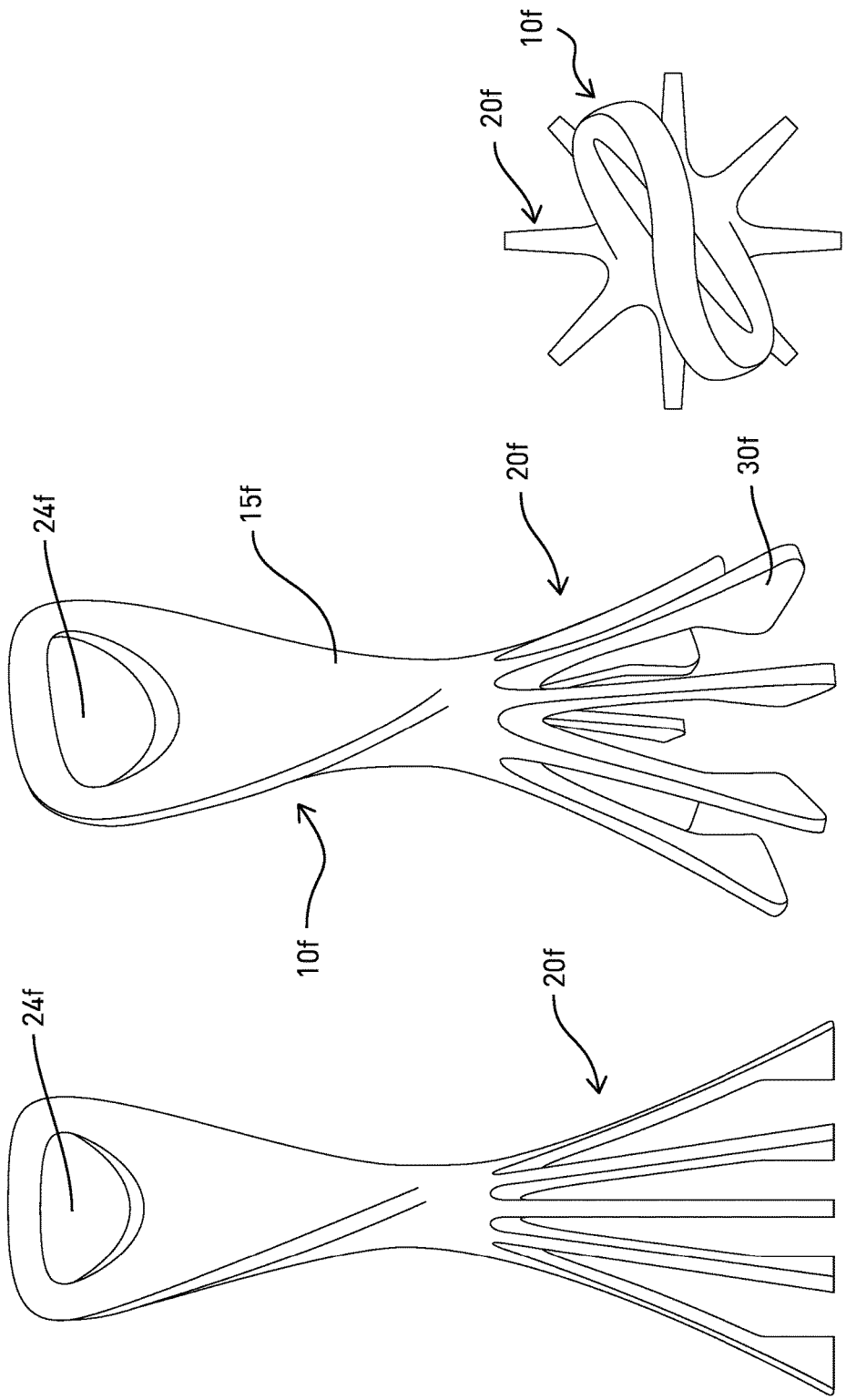

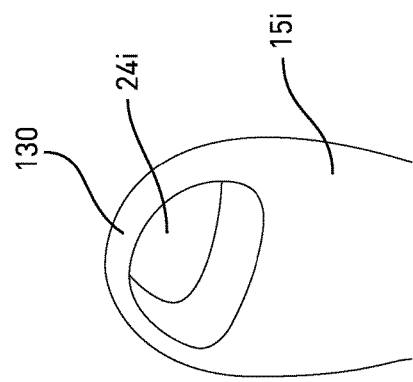
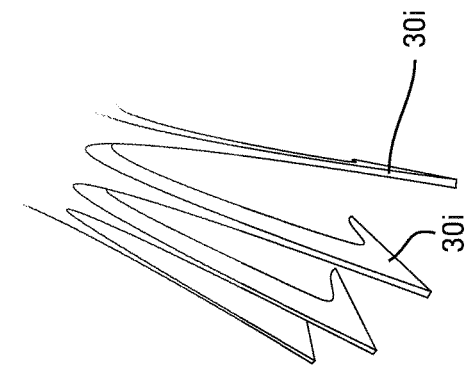
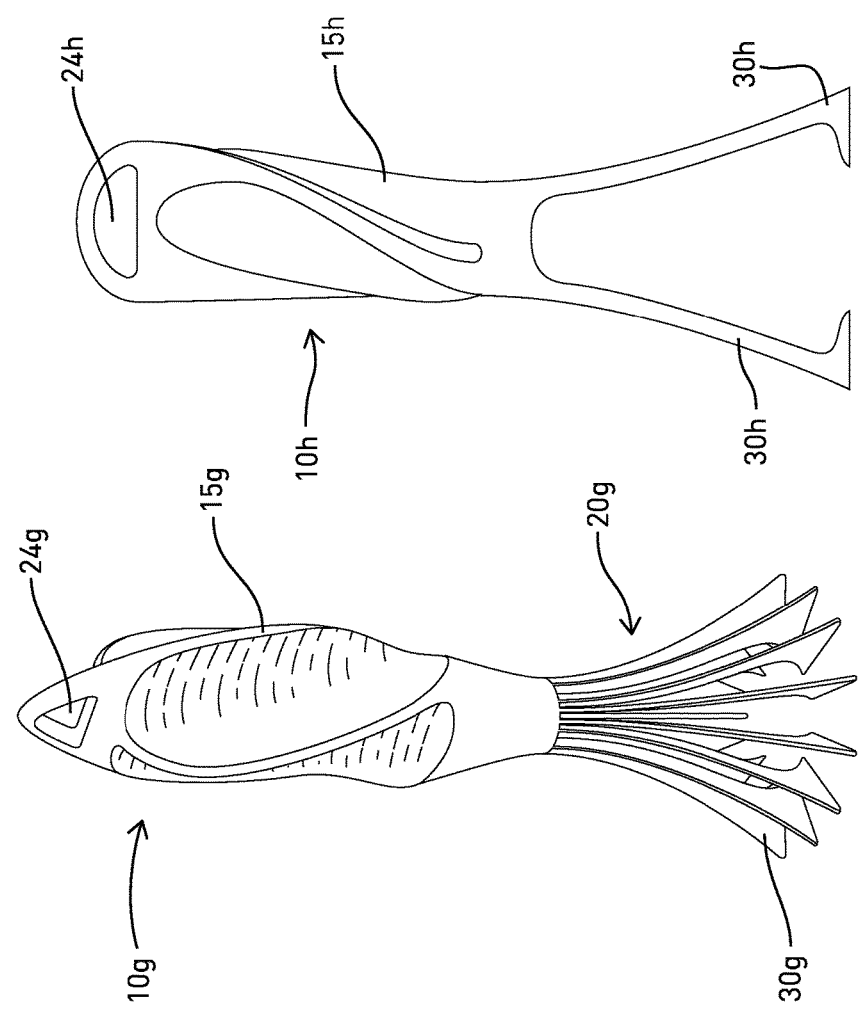

HELICOID WHISK FOR USE IN A BOTTLE

BACKGROUND OF THE INVENTION

Field of the Invention

The present invention relates generally to an agitator used for mixing solutions. More particularly, the present invention relates to an improved device for mixing solutions by hand in a bottle.

Background

It is common for persons to mix drinks in a bottle, for example, protein shake drinks, vitamin drinks, and other powders mixed into liquid. It is convenient to be able to mix these drinks in the same bottle which they will be consumed from for ease of preparation and fewer dirty dishes to wash. For example, drinks may often be mixed in a blender, but then the blender must be washed. Additionally, it may be desirable to mix drinks during the day when one is away from home and a blender is not available.

Several methods are commonly used to mix drinks in a bottle. For example, the powder and the liquid may be added, the lid put into place, and the bottle merely shaken. However, this often results in a poorly mixed solution with some powder not dissolving. There are known in the art some physically independent agitators that may be placed in a bottle; however these agitators can also result in poorly mixed solutions as the agitators freely move in the bottle and do not reach all portions of the bottle.

Thus, there is a need for an improved apparatus and method to mix drinks in a bottle. It may be advantageous for the apparatus and method to be easy to employ and allow all or substantially all of a powder to be mixed into the drink.

SUMMARY

Thus, the present disclosure provides an apparatus and method for improved mixing or agitation of drink solutions in a bottle. According to one configuration, an agitator is provided that consists of a whisk portion and a handle portion.

According to one configuration, the whisk portion includes a plurality of whisking members. Whisking members may take on a variety of shapes and sizes, but in most embodiments whisking members form a generally flat-bottom.

According to another aspect, the agitator may be easy to insert and remove from a bottle. In some configurations, the handle portion is provided with a loop or hole to lift or grasp the agitator.

According to another aspect, the whisk portion and handle portion are two separate elements. In yet another aspect, the whisk portion and handle portion are formed integrally.

According to yet another configuration, the handle portion may comprise a helicoid or spiral. This may allow solution that passes by the handle to cause the agitator to spin.

According to another configuration, the whisking members of the whisk portion are formed of a material that is bendable and flexible such that when the whisking members come into contact with the bottle of the bottle, the whisking members flex and splay outwardly.

According to another aspect, the whisk portion is provided with a plurality of whisking members which are comprised of flexible linear structures with balls on the ends. Several variations for whisk and whisking members that vary in shape and size are disclosed.

These and other aspects of the present disclosure are realized in an apparatus and method for the mixing of an solution in a bottle as shown and described in the following figures and related description.

BRIEF DESCRIPTION OF THE DRAWINGS

Various embodiments of the present disclosure are shown and described in reference to the numbered drawings wherein:

FIG. 1 illustrates a perspective view of an agitator according to one configuration;

FIG. 4 illustrates a perspective view of an agitator according to another configuration;

FIG. 5 illustrates a perspective view of an agitator according to yet another configuration;

FIG. 7A shows an exploded view of the handle portion of the agitator shown in FIG. 7B;

FIG. 7B shows a perspective view of an agitator according to another configuration;

FIG. 7C shows a perspective top view of the agitator according to FIG. 7B;

FIG. 8 illustrates a perspective view of an agitator according to another configuration;

FIG. 9 illustrates a side view of an agitator according to another configuration;

FIG. 10 illustrates an exploded view of a possible configuration for whisking members of the whisk portion of an agitator;

FIG. 11 illustrates a perspective view of a possible configuration for the handle portion of an agitator;

Figure 3:
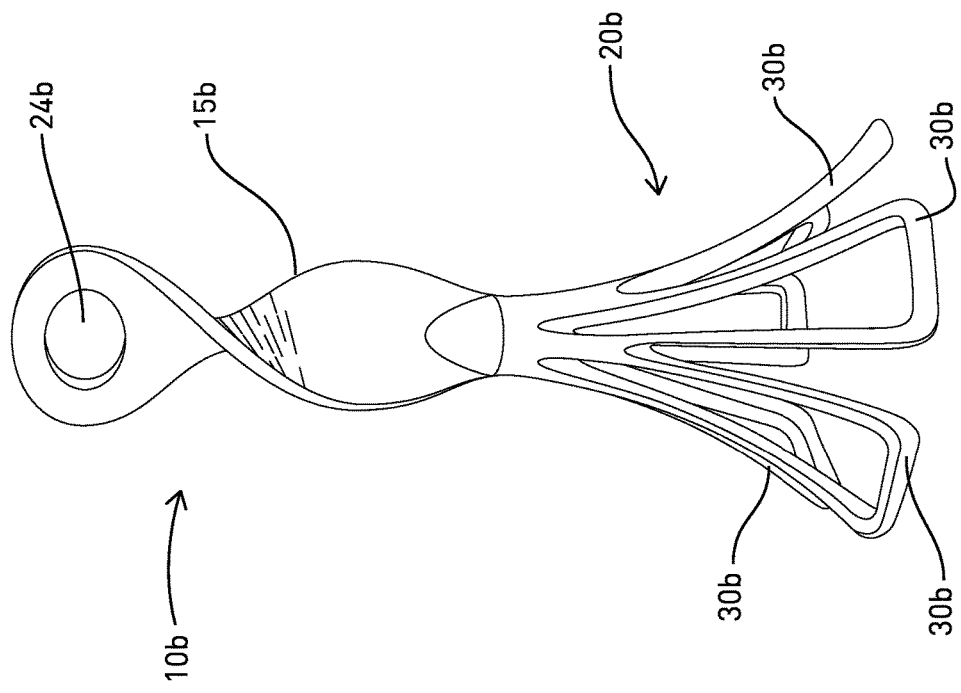
FIG. 3 illustrates a perspective view of an agitator according to another configuration.
Figure 2:
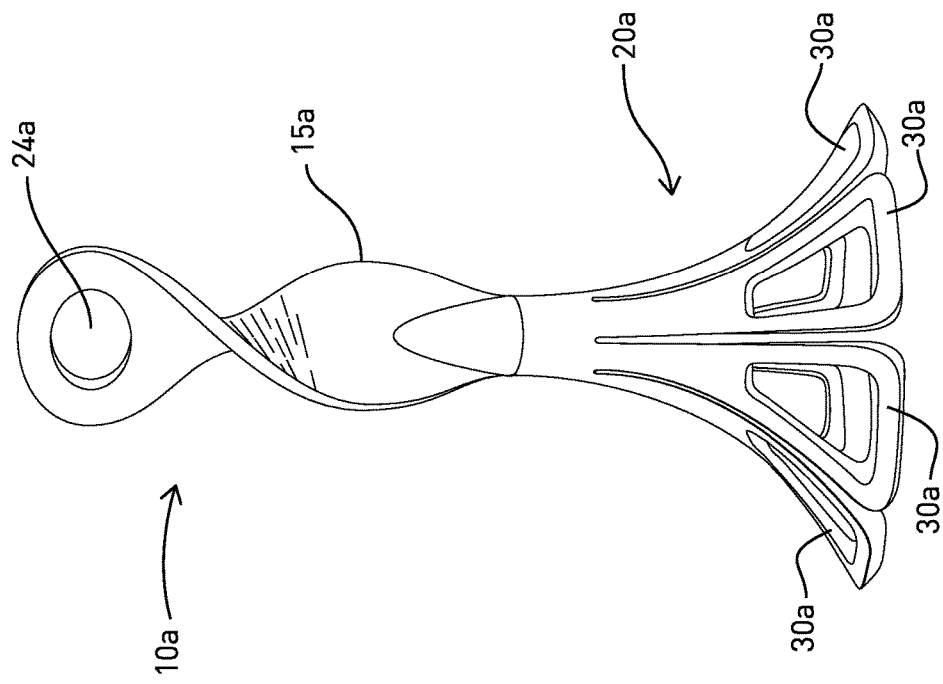
FIG. 2 illustrates a perspective view of an agitator according to another configuration.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The following description includes various representative embodiments and specific details in order to provide a thorough understanding of the present disclosure. The skilled artisan will understand, however, that the methods and devices described below can be practiced without employing these specific details, or that they can be used for purposes other than those described herein. Indeed, they can be modified and can be used in conjunction with products and techniques known to those of skill in the art in light of the present disclosure.

Reference in the specification to "one configuration," "one embodiment" "one aspect" or "a configuration," "an embodiment" or "an aspect" means that a particular feature, structure, or characteristic described in connection with the configuration may be included in at least one configuration and not that any particular configuration is required to have a particular feature, structure or characteristic described. The appearances of the phrase "in one configuration" or similar phrases in various places in the specification are not necessarily all referring to the same configuration, and may not necessarily limit the inclusion of a particular element of the invention to a single configuration, rather the element may be included in other or all configurations discussed herein. Thus it will be appreciated that the claims are not intended to be limited by the representative configurations shown herein. Rather, the various representative configurations are simply provided to help one of ordinary skill in the art to practice the inventive concepts claimed herein.

The invention and accompanying drawings will now be discussed in reference to the numerals provided therein so as to enable one skilled in the art to practice the present invention. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Prior to discussing particular configurations, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a whisking member" may include one or more of such whisking members, and reference to "the handle" may include reference to one or more of such handles.

As used herein, the term "substantially" refers to the complete or nearly complete extent or degree of an action, characteristic, property, state, structure, item, or result to function as indicated. For example, an object that is "substantially" upright in a bottle would mean that the object is either completely upright or nearly completely upright. The exact allowable degree of deviation from absolute completeness may in some cases depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

As used herein, the term "bottle" refers to any type of enclosure capable of mixing a drink in. Although the specification herein refers frequently to bottles such as common personal-sized water bottles as exemplary bottles, it is understood that the various apparatus, device and method configurations described herein may be used for many different types of bottles and containers and that the scope of the claims referring to a "bottle" or "bottles" encompasses all such types of containers or enclosures that are capable of mixing a drink or beverage or solution in, and shall not be limited by any particular references in the specification to "a bottle" or "bottles."

Turning now to FIG. 1, there is shown an apparatus, generally indicated at 10, according to one configuration of the present disclosure. According to this configuration, the apparatus is generally comprised of a handle portion, or handle 15, and a whisk portion, or whisk 20. In this configuration, the handle 15 and whisk 20 are separate elements that are connected. In other configurations, the handle 15 and whisk 20 may be integral. The configuration shown in FIG. 1 may be preferred because it may allow the handle 15 and whisk 20 to be formed of different materials. The agitator 10 has a length that allows it to remain substantially upright when placed in a bottle. Thus, when placed in a bottle and the bottle is shaken to mix a solution, the agitator 10 will remain substantially upright and be enabled to spin radially, but not end-over-end.

The Handle

Figure 6B:
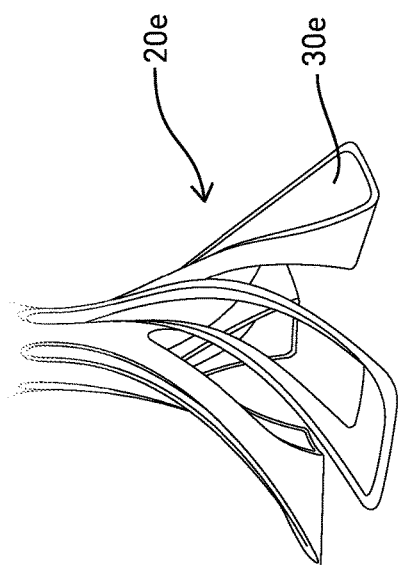
FIG. 6B illustrates an exploded view of a the whisk portion of the agitator of FIG. 6A.
Figure 6C:
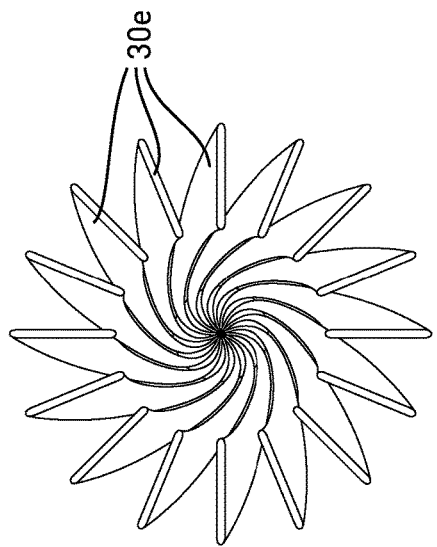
FIG. 6C shows a bottom view of the agitator of FIG. 6A.
Figure 6A:
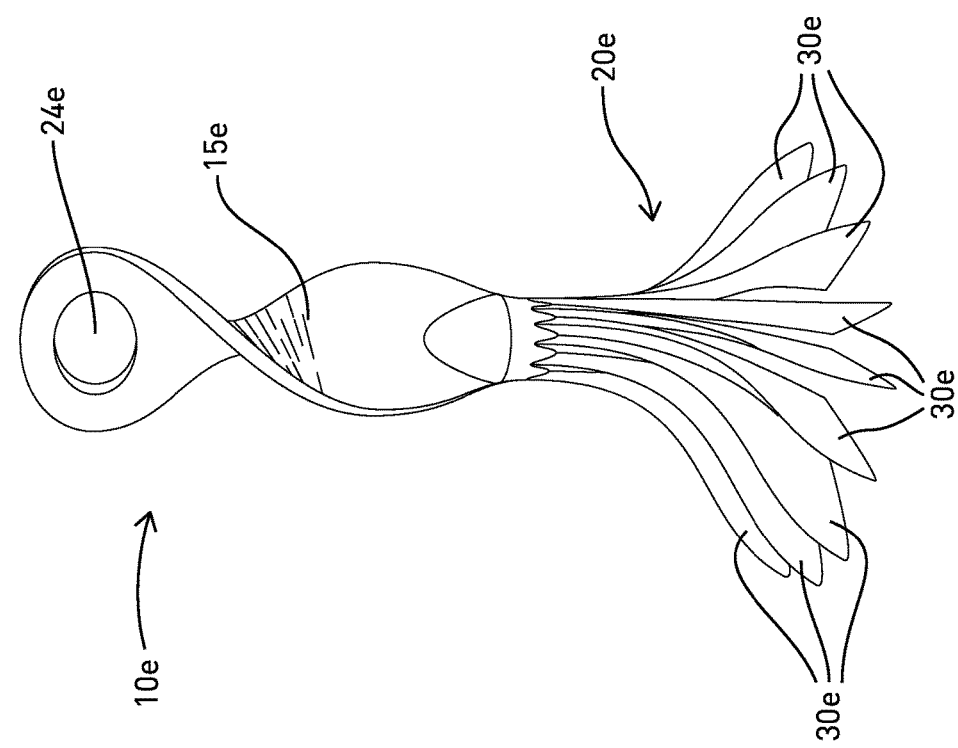
FIG. 6A illustrates a perspective view of an agitator according to another configuration.
Figure 13:
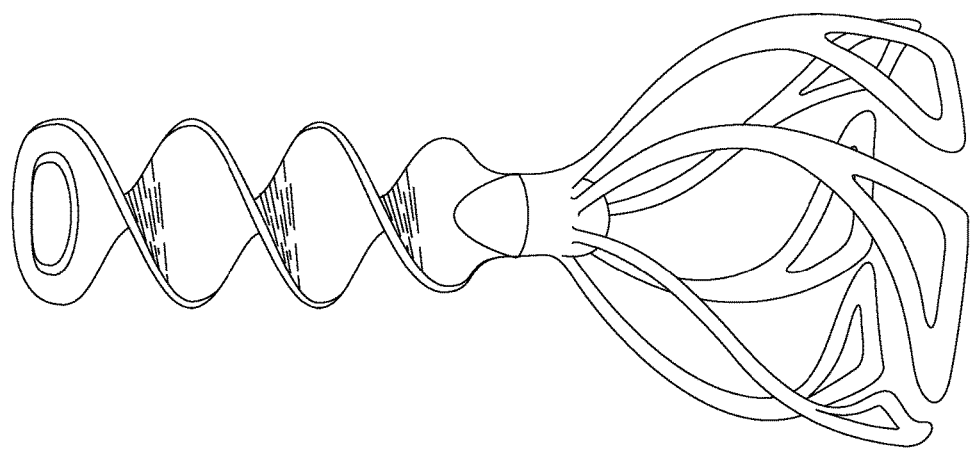
FIG. 13 illustrates a perspective view of an agitator according to another configuration.
Figure 12:
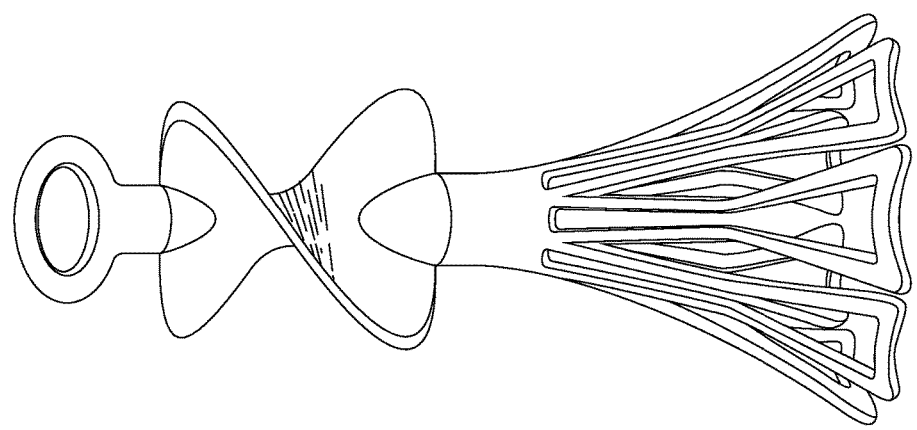
FIG. 12 illustrates a perspective view of an agitator according to another configuration.
Figure 15:
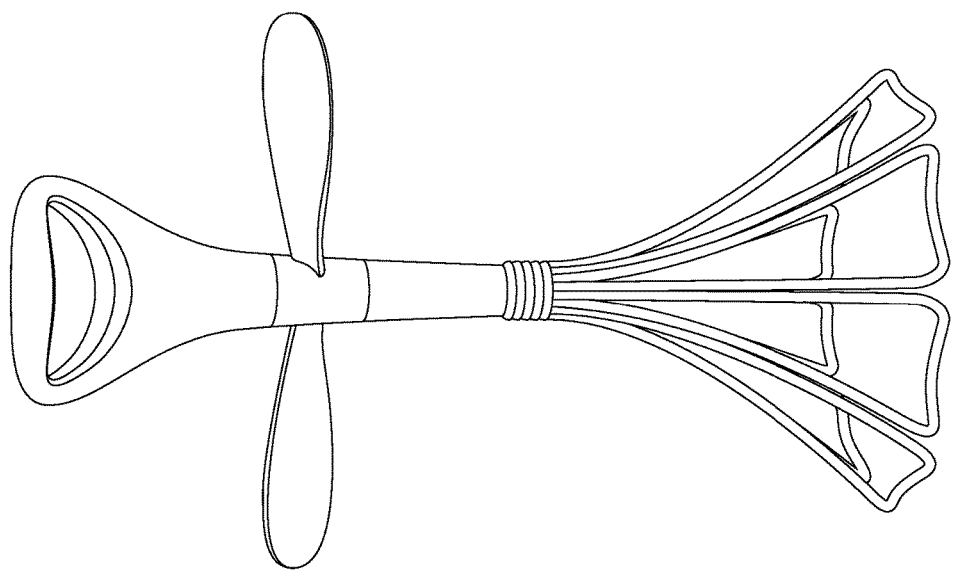
FIG. 15 illustrates a perspective view of an agitator according to another configuration.
Figure 14:
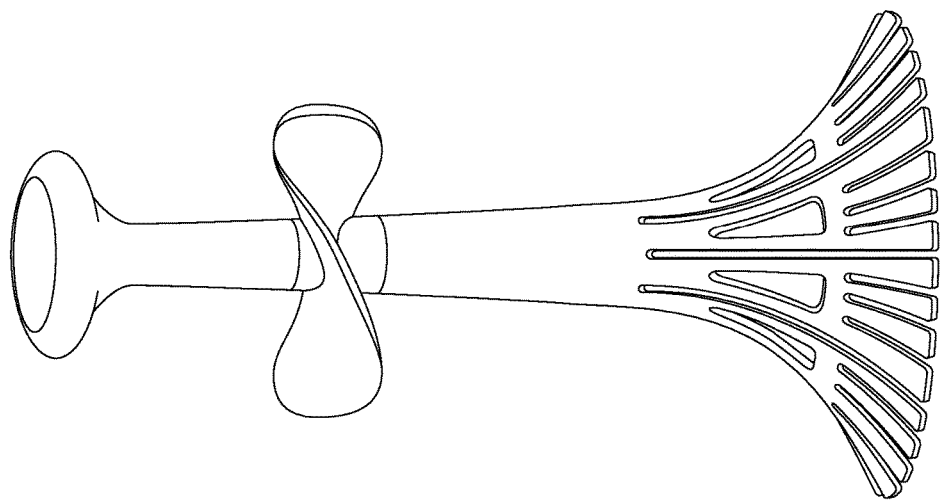
FIG. 14 illustrates a perspective view of an agitator according to another configuration.
Figure 16:
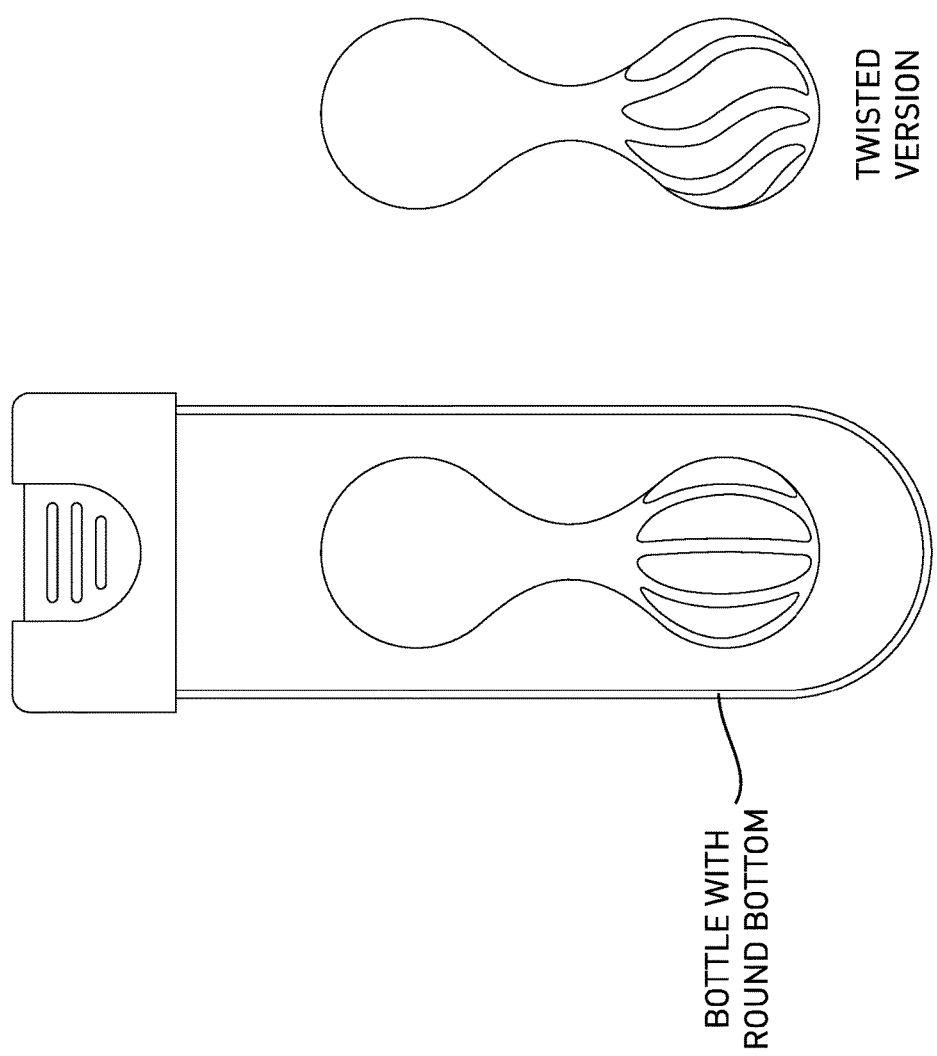
FIG. 16 illustrates a perspective view of an agitator according to another configuration.
Figure 18:
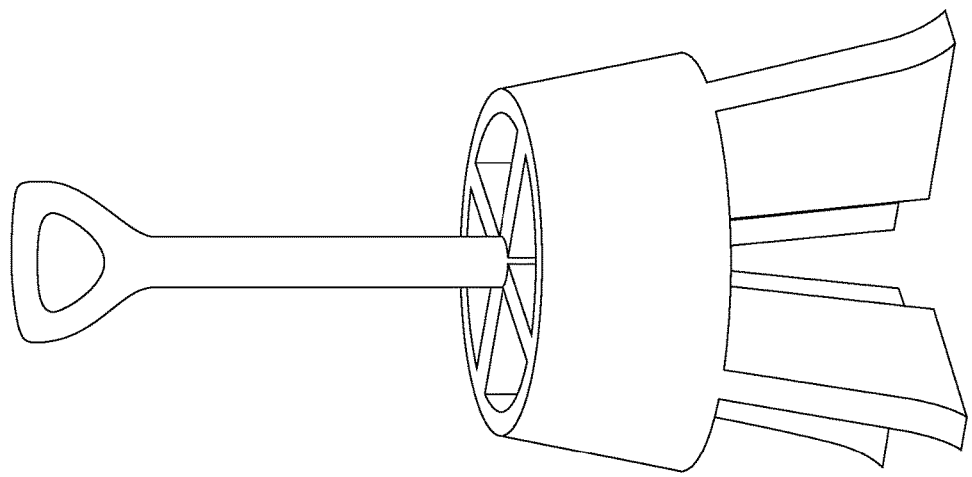
FIG. 18 illustrates a perspective view of an agitator according to another configuration.
Figure 17:
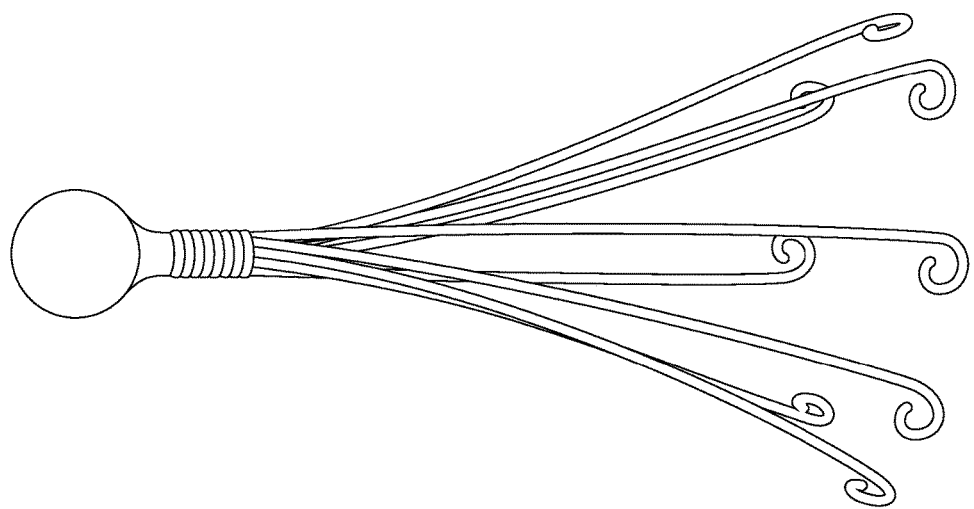
FIG. 17 illustrates a perspective view of an agitator according to another configuration.
Figure 19:
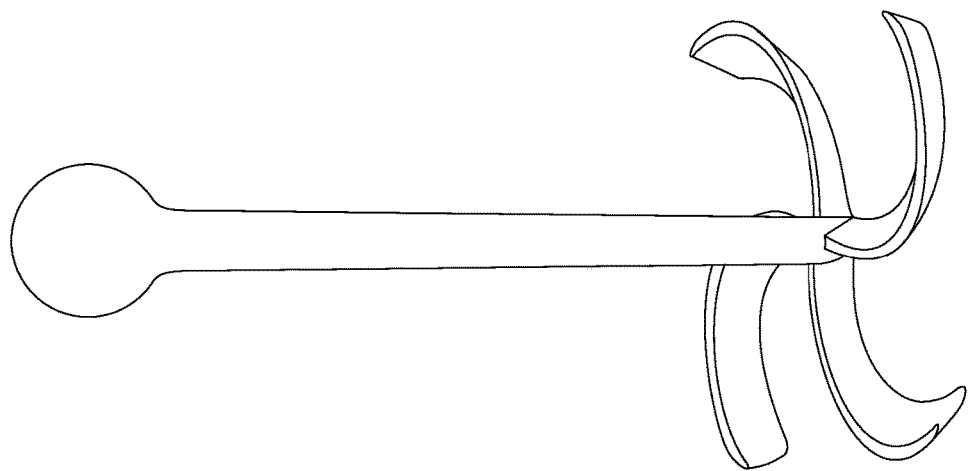
FIG. 19 illustrates a perspective view of an agitator according to another configuration.

In FIG. 1, the handle 15 generally forms a helicoid. This shape may encourage rotation of the agitator as liquid flows past the agitator. In other configurations, see, e.g., FIG. 6A, the handle 15 e may have a straight shape. It will be appreciated that the handle can have a variety of shapes and sizes and still accomplish the goal of the present disclosure. In some configurations, the agitator 10 has a generally helical shape, and in other configurations the handle 15 has a helical shape and/or the whisk 20 has a helical shape. This shape may encourage spinning of the agitator 10 about its central axis and facilitate mixing.

The handle 15 may be formed of a soft plastic or elastomeric material. In one configuration, the handle is formed of silicon. This may allow the handle to hit the lid of the bottle as the bottle is shaken and make a less disturbing impact and sound as a harder material, like metal for example, hitting the lid of the bottle. The handle 15 may be attached to the whisk 20 by any suitable means, and may be formed integral to the whisk 20 in some configurations.

The handle 15 has a proximal end 17 and a distal end 19. The proximal end, as defined herein, would be the end closer to the user when they place the agitator 10 into a bottle. The proximal end 17 of the handle 15 may define a void 24. This void 24 may be used to easily pull the agitator 10 out of a bottle when the solution is done being mixed. In other configurations, see, e.g., FIGS. 4, 8, and 11, the void 24 (or 24c, 24g, or 24i, respectively) may be larger or smaller and formed of different shapes and sizes. For example, in FIG. 11, the void 24i is formed by a loop 130 that extends from the proximal end 17 of the handle 15. It will be appreciated that the void 24 can be formed in many different configurations and still accomplish the same goal. Likewise, the handle 15 can be formed without the void 24.

The Whisk

The agitator includes a whisk 20 attached to the distal end 19 of the handle 15. The whisk includes whisking members 30. A plurality of whisking members 30 may be used. In FIG. 1, four whisking members 30 are shown. In other configurations, fewer whisking members may be used (for example, two whisking members 30h are shown in the configuration in FIG. 9), or more whisking members may be used (for example, see FIGS. 5, 6A, and 8).

The whisking members 30 are all the same length, or substantially the same length. This gives the bottom of the whisk 20 a generally flat shape. When placed in a bottle, the agitator 10 could stand upright. Additionally, the length of the agitator (i.e., the length of the handle 15 plus the whisk 20) may be such that the agitator 10 would not be able to rotate end-over-end in the bottle, but rather remain upright. Thus, in some configurations, the length of the agitator 10 would be greater than the diameter of an average-sized personal drinking bottle. For example, the agitator 10 may be around six inches long. The agitator may also come in different sizes for different-sized bottles, such as four-, six-, eight-, and ten-inch sizes.

The whisking members 30 are generally angled outwardly from the handle 15, such that the bottom of the whisk 20 has a larger circumference than the top of the whisk. This shape may allow the whisking members to engage the bottom surfaces of the bottle, especially the outer perimeter of the bottom surface of the bottle, where substances such as powders often stick and are not mixed into the solution.

The whisking members 30 may be formed of any suitable material such as plastics, metal, etc. It may be desirable to form the entire agitator 10 from materials that are dishwasher safe for easy cleaning. In some configurations, the whisking members 30 are formed of a flexible material. Thus, when a bottle containing the agitator 10 is being shaken, and the bottom of the whisking members 30 comes into contact with the bottom of a bottle, the whisking members 30 splay outwardly. This may further allow the agitator 10 to mix powders, etc. that may stick to the outside edges of the bottom of the bottle.

In some configurations, the whisking members 30 may be hollow or have voids therein for solution to pass through (see FIG. 1, for example). In other configurations, the whisking members may be solid (see FIG. 6A, for example). It will be appreciated that may different shapes, sizes, and configurations may be used for the whisking members 30 while still accomplishing the same ends.

FIGS. 2 through 11 show various configurations possible for agitators 10, including various types of handles 15 and whisks 20. For example, FIG. 5 shows a whisk 20d having whisking members 30d that have small balls on the ends. This is similar to a ball-type whisk. In some configurations, the whisk forms a helix-shape, the handle forms a helix shape, or the whisk and the handle together form a helix shape. This shape may facilitate spinning of the agitator 10 about its central axis as fluid passes through the agitator 10, and thus facilitate mixing of the solution.

In use, a person desiring to mix a drink in a bottle would put the agitator 10 into their bottle. Next, liquid and powder (or any other substance that would be desirable to mix-in) are placed in the bottle. The lid is placed on the bottle, and then the entire bottles containing the liquid, powder, and agitator 10 is shaken. The agitator 10 mixes the powder into the liquid as it moves up and down (but not end-over-end) in the bottle. The agitator 10 rotates about its central axis as it moves up and down and liquid flows by it and through it. As the bottom of the whisk 20 comes into contact with the bottom of the bottle, the ends of the whisking members 30 are splayed outwardly. This allows the whisking members to mix powder that may be caught at the bottom, outward edges of the bottle. Since the agitator 10 is also rotating as the whisking members 30 are splayed outwardly, this increases the chance that any powder caught at the bottom, outer edges of the bottle will be mixed.

Thus there is disclosed an agitator apparatus including a handle attached to a whisk, wherein: the handle comprises a helicoid; the whisk comprises a plurality of whisking members, the whisk having a flat bottom; and wherein the agitator has a length that allows the agitator to remain substantially upright when placed in a bottle. The handle may comprise a proximal end and a distal end, wherein the proximal end defines a void and the distal end is attached to the whisk. The handle may be formed of elastomeric material, for example silicone may be used.

The whisking members may be of all the same length, such that the whisk has a substantially flat bottom. The whisking members may be formed of flexible material, and may angle outwardly from the handle.

In another configuration, there is disclosed an agitator apparatus including a handle attached to a whisk, wherein the whisk comprises a plurality of whisking members, the whisk having a flat bottom and forming a spiral shape; and wherein the agitator has a length that allows the agitator to remain substantially upright when placed in a bottle. The whisking members may be solid or have voids, or openings, or the like, formed therein to allow fluid to flow through the whisking members. The whisking members and/or the handle may have a helix shape. The whisking members may splay outwardly when the whisking members come into contact with a bottom of the bottle.

There is also disclosed a method for mixing a solution in a bottle, the method comprising: providing an agitator comprising a handle attached to a whisk, wherein: the handle comprises a helicoid; the whisk comprises a plurality of whisking members, the whisk having a flat bottom; and wherein the agitator has a length that allows the agitator to remain substantially upright when placed in the bottle; placing the agitator in the bottle; placing a lid on the bottle; and shaking the bottle such that the liquid flows past the agitator, causing the agitator to spin and mix the solution.

The step of shaking the bottle may also include causing the flat bottom of the whisk to splay outwardly when the flat bottom of the whisk comes into contact with a bottom of the bottle.

Furthermore it will be appreciated that other inventions are hereby disclosed. While the present application shows several different representative configurations, the invention may be embodied in other forms without departure from the spirit and essential characteristics thereof. The embodiments described therefore are to be considered in all respects as illustrative and not restrictive. Although the present invention has been described in terms of certain presently preferred embodiments, other embodiments that are apparent to those of ordinary skill in the art are also within the scope of the invention. For example, components of agitator and system can be varied in size, materials, shape, form, function, manner of operation and assembly in accordance with the intended use. Accordingly, it is not intended that the invention be limited, except as by the appended claims.

What is claimed is:

1. An agitator apparatus comprising:
   a handle portion and a plurality of whisking members, the handle portion being connected to the plurality of whisking members, wherein the handle portion is twisted at a rate of one 180° twist per two to five inches to form a turbine helicoid structure;
   a bottle comprising a sidewall and a bottom connected to the sidewall, the bottom connected to the sidewall forming a bottom outward edge of the bottle, and the bottle further comprising a bottle diameter, and wherein the agitator apparatus is removably located within the bottle;
   wherein each of the plurality of whisking members extends from a first end to a second end, the first end being attached to the handle portion, and the second end not attached to the handle portion, wherein the second ends of each of the plurality of whisking members engages the bottom outward edge of the bottle; and
   wherein the agitator apparatus has a length, the length of the agitator apparatus being greater than the diameter of the bottle.

2. The agitator apparatus of claim 1, wherein the handle portion comprises a proximal end and a distal end, and wherein the proximal end defines a void and the distal end is attached to the plurality of whisking members.

3. The agitator apparatus of claim 1, wherein the handle portion is formed of elastomeric material.

4. The agitator apparatus of claim 3, wherein the handle portion is formed of silicone.

5. The agitator apparatus of claim 1, wherein the plurality of whisking members are all of the same length, and wherein each of the plurality of whisking members is curved from the first end to the second end, and wherein each of the plurality of whisking members is curved in the same direction.

6. The agitator apparatus of claim 1, wherein the plurality of whisking members are formed of flexible material.

7. The agitator apparatus of claim 1, wherein the plurality of whisking members curve outwardly from the handle portion.

8. The agitator apparatus of claim 1, wherein the whisking members are also twisted to form a turbine structure.

9. The agitator apparatus of claim 1, wherein the whisking members splay outwardly when the whisking members come into contact with the bottom of the bottle, and wherein the bottle further includes a lid.

10. An agitator apparatus including a handle attached to a whisk, wherein:
    the handle and whisk form a helicoid having one and a half 180° twists per four to ten inches, the handle and whisk being removably located within a bottle having a bottle diameter and a lid;
    the handle comprises a portion of the helicoid formed from a continuous piece of elastomeric material, the handle configured to convert kinetic energy of flowing fluid into mechanical work in the form of a rotational motion in reaction to a flow of fluid in the bottle around the helicoid;
    the whisk comprises a plurality of whisking members; and
    wherein the agitator apparatus has a length that is greater than the bottle diameter.

11. The agitator apparatus of claim 10, wherein the handle comprises a proximal end and a distal end, and wherein the proximal end defines a void and the distal end is attached to the whisk.

12. The agitator apparatus of claim 10, wherein the whisking members are all of the same length.

13. The agitator apparatus of claim 10, wherein the whisking members are formed of flexible material.

14. The agitator apparatus of claim 10, wherein the whisking members angle outwardly from the handle.

15. The agitator apparatus of claim 10, wherein the handle and whisk form a continuous turbine, helical shape.

16. The agitator apparatus of claim 1, wherein the helicoid of the handle is formed from a continuous piece of elastomeric material.

17. The agitator apparatus of claim 1, wherein the whisking members have different lengths.

18. The agitator apparatus of claim 10, wherein the helicoid comprises one and a half twists per six inches.

19. The agitator apparatus of claim 5, wherein each of the first ends of the plurality of whisking members attached to the handle portion are radially mounted to the handle portion.

20. The agitator apparatus of claim 1, wherein the plurality of whisking members have holes formed therein to allow fluid to flow through each of the plurality of whisking members.

* * * * *